Sept. 21, 1965 E. A. J. MROZ 3,207,676
HEAT TREATING OF LIQUORS CONTAINING DISSOLVED SOLIDS
WHOSE SOLUBILITY DECREASES AT
INCREASING TEMPERATURE
Original Filed Jan. 5, 1961 3 Sheets-Sheet 3

Inventor
Edmund A. J. Mroz
by John E. Herling
ATTORNEY 3,207,676
HEAT TREATING OF LIQUORS CONTAINING DISSOLVED SOLIDS WHOSE SOLUBILITY DECREASES AT INCREASING TEMPERATURE
Edmund A. J. Mroz, Stoneham, Mass.
(17 Harrison St., Melrose, Mass.)
Continuation of application Ser. No. 80,809, Jan. 5, 1961. This application Oct. 7, 1963, Ser. No. 315,430
18 Claims. (Cl. 202—46)

This application is a continuation of my application Serial No. 80,809, filed January 5, 1961, and now abandoned.

This invention relates to the general heat treating of liquids which contain dissolved solids whose solubility decreases at increasing temperature. This invention is concerned particularly with the conversion to fresh water of sea and brackish waters and with the treatment of natural and industrial wastes to effect economic reutilization of the solvent material (which most frequently is water that would otherwise in its polluted state have contributed to stream pollution) while facilitating the recovery of by-products.

The recovery of the solvent portion of sea water or brackish waters is of major importance in this country and is of critical importance abroad. Closely associated with the recovery of the solvent portion from these contaminated water sources is the problem of handling deposition of solute, particularly those salts which precipitate to form scale as the temperature of the solution is raised in carrying out the separation of solvent from solute in the volatilization and subsequent recovery of solvent from the solution.

Heretofore, the general approach to the problem has been to effect separation within those limits of the solubility of solute in solvent where the tendency towards deposition of scale-forming materials was limited by solute saturation conditions permitted by the particular solvent. Another approach to the problem has been to provide excess surface upon which scale formation would be permitted, the operation later being interrupted to effect scale removal. Both of these alternatives are inherently inefficient.

It is the purpose of this invention to teach a simple and practicable method for effectively alleviating the problem of scaling of heating surfaces, thereby making possible the extension of applicability, effectiveness, range and economy of processes heretofore hampered by the problem of scaling.

Another object or purpose of this invention is to teach the application of simple precepts whereby to achieve an effective alternate pre-treatment of liquids prone to scale-depositing tendencies under heat treating.

A further object of this invention is to provide an efficient economic process for pre-treating liquids containing dissolved solids so that subsequent treatment of said liquids for the removal of the solvent portion may be carried out with greater economy.

A still further object of this invention is to provide a process for carrying out the solute removal of contaminate liquids at parameters of temperature and concentration heretofore not practiced by the art.

A still further object of this invention is to provide a process for volatilization of an impure stream of liquid with subsequent utilization of the vapors issuing therefrom to dilute and heat another stream of impure liquid which may be used as the feed liquor in subsequent apparatus wherein higher temperatures than heretofore possible or feasible may be employed.

A still further object of this invention is to provide a process in which simultaneous absorption and heating of impure liquid streams at pressures in excess of atmospheric pressure may be utilized to effect further dilution and heating at elevated temperatures and pressures in excess of atmospheric pressure to provide a feed liquor for subsequent heat treatment at temperatures and pressures in excess of those heretofore employed.

These and other objects of my invention, as will become apparent to those skilled in the art from the following specification and claims, are accomplished by directing a stream of impure feed liquor into a chamber wherein said liquor is brought into direct contact with a stream of heated gas, thereby vaporizing a portion of the liquid, reducing the temperature of the gas, and increasing the moisture content of the cooled gas above the moisture content of said heated gas, directing the vapor containing gas into a second chamber wherein the same is contacted with additional impure liquid at a temperature below the temperature of the gas entering the second chamber, to thereby heat the liquid therein introduced and, at the same time, to dilute the impurities of the liquid introduced into the second chamber with the condensing portion of the vapor content of the gas therein introduced and providing the diluted heated impure liquid of the second chamber for subsequent heat treating procedures. Of course, it is not necessary to use impure liquid from the same source as the feed for both pre-treatment chambers. Although it is entirely within the contemplation of this invention to use the same liquid on both pre-heating chambers, one or more such impure liquids may be used to advantage in either or both of said pre-heating chambers. Further, it is within the scope of this invention to operate at vacuum, to operate at atmospheric pressure or to operate at pressures in excess of atmospheric pressure.

While in the inittal consideration of my process it may appear that a very definite step backward has been taken to achieve the desired result, careful consideration of the teaching contained herein will reveal the distinct advantages of simultaneous dilution and heating of impure liquid streams prior to further heat treatment for the purpose of removing the solute and solvent portion of a contaminate liquid. Since the initial step in carrying out my process is conducted in a chamber wherein direct contact of liquor with heating medium is provided for, and since the chamber is preferably constructed without having substantial surface on which scale formation can occur, it is possible and frequently desirable to conduct the vaporization of impure liquid at temperatures in excess of those at which precipitation of solute would occur in accordance with known solubility data. However, it is also possible, and a definite advantage is realized whether or not the initial treatment of liquor results in the formation of a concentrate sufficiently high in solute to warrant precipitation of solute. However, the real advantage of my process is realized when the vapors resulting from the contacting of liquid and heating medium in the first chamber is condensed in the second chamber to dilute the impure liquor which is introduced into the second chamber.

By thus diluting the impure liquor in the second chamber, it becomes possible to carry out future heat treatment of the liquid at temperatures well in excess of those which would be permitted had the original liquor been subjected to heat treatment without dilution. Futhermore, by directing the effluent containing the diluent produced by the initial contacting of liquid with heating medium as a supplement to the solvent portion of the liquor used as the raw feed for subsequent heat treatment, the raw feed may be benefited by the heat made available to it as a result of its association with the solvent and its carrier.

Another advantage, of course, is that the dilution effect, as taught by the process of my invention, facilitates the obtaining of larger yields of solvent material from a given throughput of contaminated liquid in subsequent heat treating apparatus.

While at first it may appear more desirable to direct the fluid issuing from the initial contactor in my system to a condenser and thereby remove purified water, I have found that this is not the most economical utilization of the vapor issuing from the initial contactor. I therefore utilize these vapors to dilute, while at the same time heating, raw liquor to be later evaporated. Also, I prefer to control the amount of raw liquor introduced into the second contactor in accordance with the volume and temperature of the vapors issuing from the first contactor, so as to bring the temperature of the liquor in the second contactor to about atmospheric boiling temperature, or slightly below. In this way, I raise the temperature of the raw liquor to be evaporated to just below the vaporization temperature or to the vaporization temperature. In order to accomplish vaporization, it is of course usual to add sufficient heat to satisfy the latent heat requirements of the fluid that is being vaporized in subsequent apparatus. However, as far as the condensate vapors issuing from the initial contactor in my process are concerned, I eliminate the need of a condenser, which in and of itself demands large volumes of cooling fluid and substantial surface area on which condensation of the vapors issuing from the first reactor can occur. Instead of requiring such a condenser, the vapors from the first contactor being directed into raw liquor eventually to be evaporated, in being condensed, raise the temperature of the raw liquor and dilute the raw liquor with solvent. Accordingly, this permits subsequent heat treatment apparatus to be employed to operate at temperatures substantially in excess of temperatures which would be permitted had the raw liquor alone been directly introduced to such apparatus. Furthermore, I utilize the gas, as opposed to the condensable vapor fractions issuing from the initial contactor, and in addition to the condensable vapor fractions issuing from the initial contactor, to elevate the temperature of the raw stock introduced into the second contactor instead of requiring very substantial surface area in a condenser-cooler to cool these gases as well as the vapors, for if the gases were not cooled, neither would the vapors cool or be condensed.

Going into more detail, I refer to the accompanying drawings in which.

Figure 1:
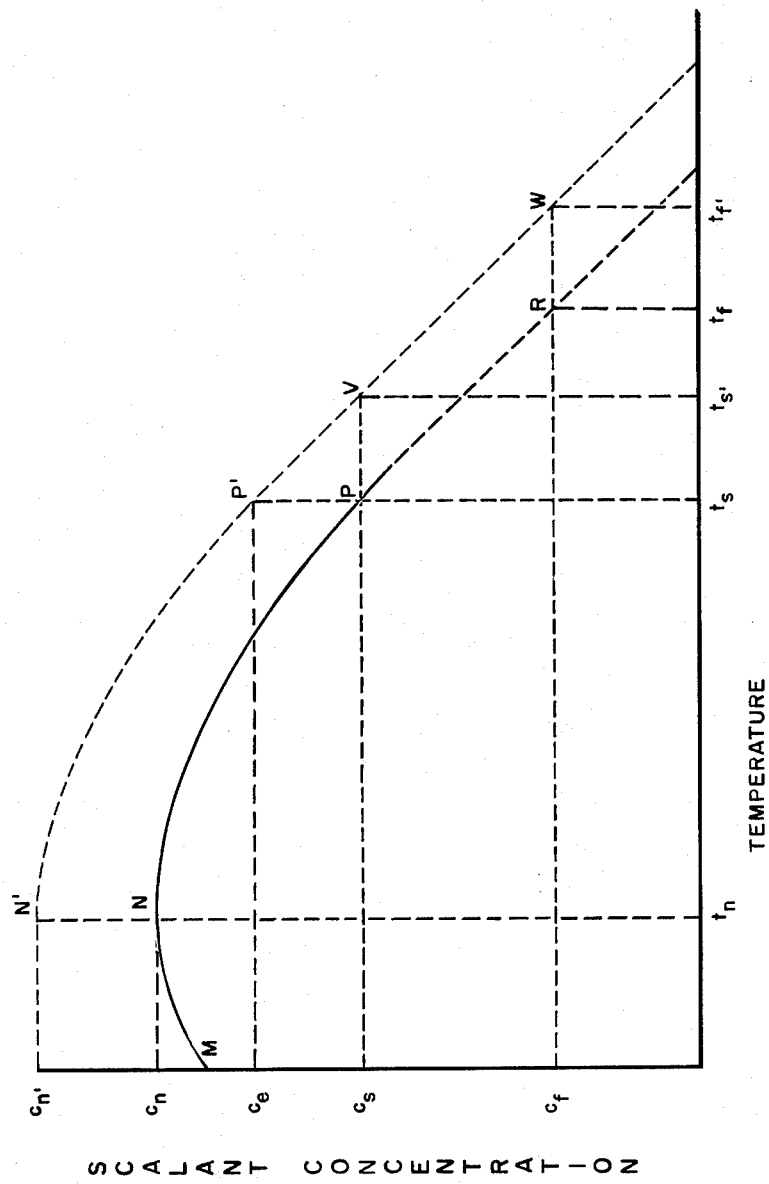
FIGURE 1 is a graph showing the scalant concentration which may be expressed either as percent of scalant in a given solution or weight parts of scale-forming constituent per unit of solution, as the same is affected by changing temperature for a saline solution such as calcium sulfate in sea water.

Since the application of my invention is not restricted to conversion of ocean water or brackish waters to purified water, I have generalized the points of the curve, as shown in FIGURE 1, since the principle involved and the application of this principle is more general than the specific illustration to be hereinafter given with respect to a preferred embodiment for carrying out the invention.

Referring to the drawing, and in particular FIGURE 1, the curve MNP represents typical saturation concentration of calcium sulfate at various temperatures between room temperature of approximately 60° F. and saturation temperature at the atmospheric boiling point, which is approximately 212° F. The broken section beyond P on the curve MNPR and R, represents an extrapolation of that curve into the region for which published data may not be available. However, the significance of the points P and R on the curve MNPR is that the point P determines the temperature $t_s$ at which the calcium sulfate present in the solution may commence to precipitate out and the point R represents the higher temperature $t_f$ where the calcium sulfate present in a diluted solution, as represented by $c_f$ may commence to precipitate out of solution.

Since scaling is a function of adhesion of the precipitate to the heating surface, scaling normally occurs at slightly higher temperatures and concentrations of solute in solution than is indicated by the curve MNPR. I represent by my curve N'P'VW a substantially parallel curve to take into account a scaling out of calcium sulfate from solution. This curve would represent conditions attained in a given apparatus. It will be noted from this curve that the initial scaling out, as represented for the calcium sulfate originally present in the sea water as designated by $c_s$, would scale out at a temperature substantially higher than the precipitation temperature $t_s$ of $t_s'$. Similarly, a diluted sea water whose concentration of calcium sulfate is illustrated by $c_f$, would scale out at point W at temperature $t_f'$ rather than at point R determined at $t_f$. One further observation in connection with these curves is that for a given temperature or saturation temperature of calcium sulfate present in the sea water feed of $t_s$, we can tolerate a higher concentration as represented by $c_e$ at point P' before scaling would occur. As a result of these considerations, with respect to scaling and the utilization of higher temperatures in the removal of the water or solvent portion of the sea water from the solution containing calcium sulfate, it appears that a definite advantage occurs when sea water is diluted.

Figure 2:
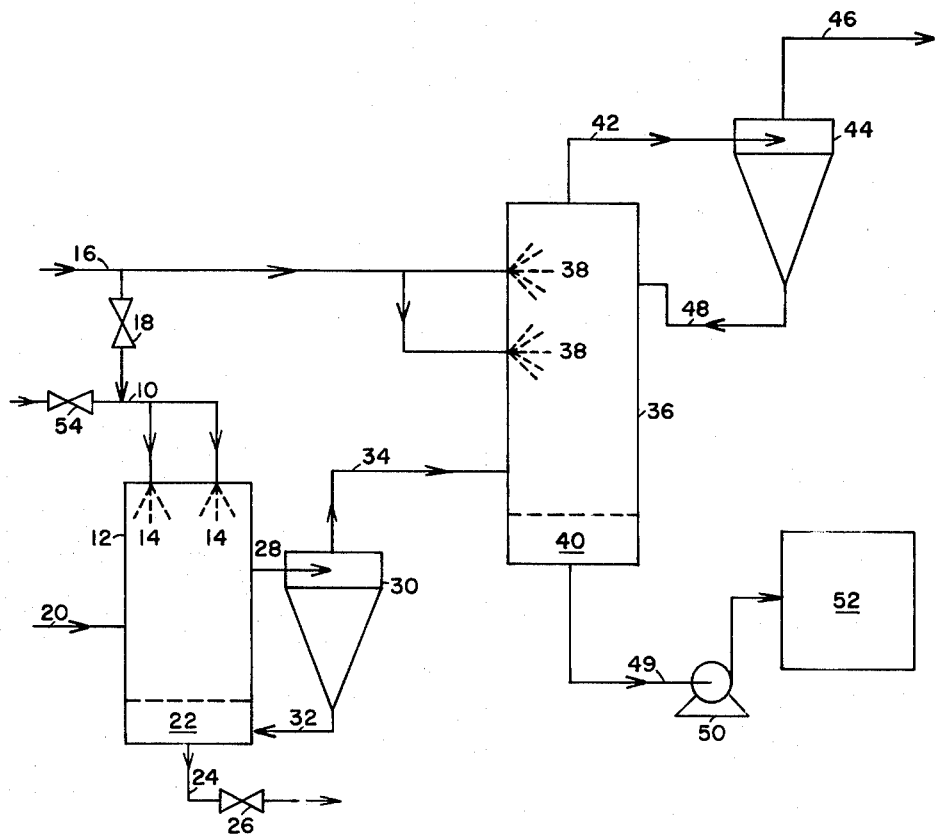
FIGURE 2 is a schematic flow diagram illustrating the basic principles of this invention.

Applying the principle, as is illustrated by these curves, to the process of this invention, I refer first to FIGURE 2, wherein is shown my process in its most elementary form, and in which raw liquor to be evaporated is first diluted with solvent and is heated during the dilution for further heat treatment eventually to separate and recover the solvent portion of the raw liquor. As used herein, the word "solvent" designates that component of the system which is present in the larger proportion. In the case of sea water, I refer to the water, free of the salts contained as the solvent. When water in other forms, such as brackish water, is used for the raw liquor, I refer to the water, free of its contaminating substances, which may or may not be in solution, depending on the circumstances affecting the water itself.

The raw liquor is introduced through line 10 into a contactor 12 and is preferably sub-divided by spraying the same into the contactor. This is shown by the numeral 14, which I use to designate the spray in the contactor. As is shown herein, the raw liquor originates in line 16, and a portion of this liquor is by-passed into line 10 through valve 18. In contactor 12 the raw liquor is run into a stream of hot gas, which is introduced into contactor 12 through a line 20. The gases, which may be waste heat gases issuing from a flue, or may be gases otherwise heated for the purpose, pass through the contactor and vaporize a portion of the liquor introduced into contactor 12, by interacting directly with the liquor as it passes through the contactor. It is to be noted that there need be no surfaces for heat interchange between the liquor and the contacting gases in contactor 12. It is also to be noted that the gases need not vaporize all of the liquor which is introduced, but that some of the liquor may be collected at the bottom of contactor 12 and is herein designated by the numeral 22. Discharge of the excess liquor is provided through line 24 and valve 26.

The temperature of the gas which is introduced through line 20 should preferably exceed the boiling point of the solvent portion of the liquor introduced. However, gases of lesser temperature can be used so long as the temperature is at least the temperature of the liquor introduced into the contactor.

The gases passing through the contactor, gain in moisture content in their travel, and pass out through line 28 into a liquid-vapor separator, as illustrated by the numeral 30. In the separator, any entrained material is removed from the gas stream and passes by line 32 to the contactor 12 from whence it is removed via line 24. The moisture laden gases pass via line 34 into a second contactor 36. Also into contactor 36 is introduced additional liquor through sprays 38, which may be positioned above the gas inlet 34. The liquid introduced through sprays 38 also interacts directly with the flow of gas through contactor 36. In this contactor, however, it is important that the temperature of the liquid introduced through sprays 38 be below the temperature of the moist gas introduced through line 34. The liquid so introduced into contactor 36, so diluted and heated, provides subsequent solvent volatilization apparatus with the liquor need of that apparatus.

The gases passing upward through contactor 36 give up their heat and moisture content to the liquor being introduced through sprays 38, and are vented from contactor 36 through line 42, by which they are carried into liquid-vapor separator 44, the gases being vented through the separator through line 46 and the entrainment being returned to the contactor through line 48.

A reserve of liquid is built up on the bottom of contactor 36 and is conveyed therefrom through a pump 50 which directs the liquid into subsequent solvent liquid volatilization equipment 52.

While I have shown means for introducing the same raw liquor into contactor 12 and contactor 36, it is possible to introduce different liquors into these two contactors by means of valve 18 and valve 54. Should a different liquor be desirable for contactor 12, valve 18 would be closed and valve 54, which would connect to the source of the liquor desired, would be opened to permit the desired liquor for contactor 12 to be introduced. It should be appreciated that while I have indicated that it is not necessary to provide heat transfer surfaces in contactors 12 and 36, it is possible to use such surfaces as bubble cap trays or the like without materially departing from the spirit and scope of my invention.

While I have shown two contactors which are used to illustrate the concept of diluting the feed liquor from initial concentration $c_s$ as shown in FIGURE 1 to $c_f$ as shown in FIGURE 1, it will be appreciated by those skilled in the art that if the gases issuing from line 46 have additional recoverable heat and moisture, it may be desirable to add yet another contactor similar to contactor 36 to the apparatus for the purpose of scavenging additional heat and moisture content from those gases, as this additional contactor would be consistent with the practice of my invention as herein set forth.

It will of course be appreciated that should such a contactor be used, it would be possible to add either the raw liquor or any liquor as the feed liquor to such a contactor. Or, the warm diluted liquor from that contactor could be used as the feed liquor to an earlier contactor, such as contactor 36, but would not be returned to contactor 12.

It is of course the purpose of this device not only to dilute the concentration of solute in the raw liquor, but also to raise the temperature of the raw liquor so diluted, which is a definite additional value obtainable from the practice of this invention, over and above the value obtainable by the dilution of the liquor alone. Of course it will be appreciated by those skilled in the art, that it is desirable to heat the feed liquor to be used in subsequent heat treating operations to the highest temperature consistent with carrying out an effective volatilization of the solvent. It will also be appreciated that by taking advantage in contactor 12 of direct contacting of liquor with hot gas, I may extract part of the heat value of the gas, and increase its moisture content so as to heat and dilute additional feed liquor in the subsequent apparatus herein numbered 36. Also, by the practice of my invention, I effectively realize the benefit of the extracted heat without necessitating the use of condenser surfaces. That is to say, I obtain the moisture as diluent for the raw material without the need of interposing a condenser surface in the system. Accordingly, by this process, I eliminate surfaces which otherwise would adversely affect other components in the apparatus as the result of scaling. Instead of using such surfaces, the moisture is directed into further contact with raw liquor so as to dilute the same while heating it, and thereby benefiting the raw liquor for its further use in subsequent heat treating apparatus.

While thus far I have described my invention having in mind one of its principal forms of utilization in connection with the recovery of heat from what would otherwise be waste heat sources, my invention is not so limited in its application, for it may be used for the purpose of creating additional driving force for the eventual volatilization of solvent from the solution. One of the principal ways of accomplishing this result would be to conduct the initial step of removing the solvent from the solution under conditions of higher pressure than would normally be used in connection with the drawings as shown in FIGURE 2. The principles involved when higher pressure operation is employed are substantially identical with those hereinabove described, but the apparatus employed would be somewhat different with respect to the introduction of heat which would be required to raise the temperature or driving force to the desired value and the apparatus used for containing the materials and process. Accordingly, for a better understanding of this one of my preferred embodiments, I refer now to FIGURE 3.

Figure 3:
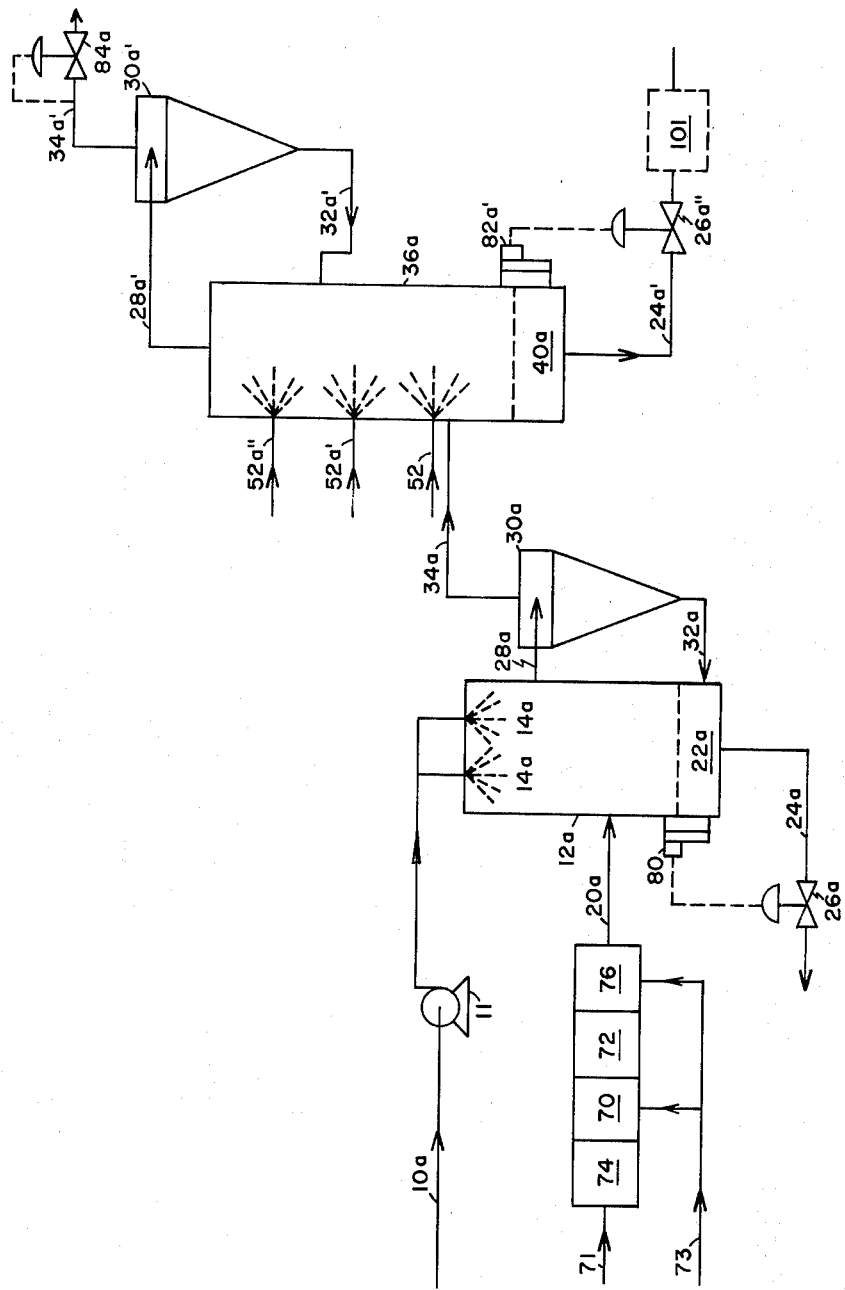
FIGURE 3 is a schematic flow diagram showing a preferred method for imparting heat and solution to a fluid stream at pressures in excess of atmospheric pressure.

In FIGURE 3 the raw liquor is introduced through line 10a into contactor 12a by means of spray nozzles which subdivide the liquor into the form of a spray 14a; a pump 11 is interposed in line 10a to maintain a requisite positive pressure in line 10a; hot gases are introduced into the contactor 12a through line 20a. In this instance the gases are produced under pressure, and my preferred method for supplying the hot gases needed for contactor 12a, is to provide a jet turbine engine of the aircraft type modified for stationary service in which fuel 73 is burned in chamber 70 to drive a gas turbine 72, which in turn drives an air compressor 74 to compress air 71 to the system pressure, issuing combustion gases containing substantial excess air. These gases are directed toward an after-burner section 76, wherein additional fuel is introduced and burned to create hotter gases having a lesser amount of excess air present. These gases are under pressure, which pressure may be controlled within broad limits of operation, as may the temperature of the gases be controlled within broad limits. With this apparatus, gas at temperatures in the order even of 3,000° F. and 100 pounds pressure more or less, depending on requirements, may be produced. These gases are directed via line 20a into the contactor, wherein they contact the liquid introduced through line 10a. The gases still under pressure but substantially cooled as a result of evaporating moisture bodily from the spray of liquor they encounter in the contactor, pass by line 28a into a liquid-vapor separator 30a. The liquid which is introduced into contactor 12a is introduced at such a rate that there is a build-up of the same in the bottom section of contactor 12a. This build-up is illustrated by the numeral 22a. This excess liquor which is built up in contactor 12a is withdrawn through line 24a through valve 26a on level control which is preset, so as to maintain a given level of liquor within contactor 12a. The level control 80 functions in a manner well known to those skilled in the art, and its purpose is to maintain liquor at a desired level within contactor 12a, so that the hot combustion gases of line 20a are not permitted to escape the contactor by this path. By adjusting the volume of liquor introduced through line 10a and the amount of heat which is introduced through the hot combustion gases of line 20a, I am able to control the concentration of the liquor leaving contactor 12a through line 24a. In some applications, this concentrated liquor will have values as by-products which would materially add to the economics of my process.

Although the solution which is introduced through line 10a may have sufficient solute as would result in precipitation of solute in the removal of solvent which occurs in contactor 12a, since this concentration is accomplished substantially in the absence of heating surfaces, no problem of scaling arises. Any precipitate which is formed in the reactor 12a may be continuously discharged with the concentrate in line 24a.

In the separator 30a any entrainment is removed and passes by line 32a back to contactor 12a.

The gases issuing from separator 30a are still under positive pressure and pass via line 34a into a second contactor 36a. In this contactor I further quench the gases therein introduced with liquor which is to be diluted and heated for further heat treatment. I have illustrated in the drawings three separate points of introduction of liquor into contactor 36a. One of these lines bears the numeral 52, since it may receive the liquor issuing from the contactor 36 of FIGURE 2. However, this is optional. The other lines may have liquor which has been heated to an intermediate temperature, and another line may be the cold raw feed. I have illustrated these lines by the numerals 52a' and 52a''.

From the bottom of contactor 36a, I discharge under presure a diluted heated liquor suitable for subsequent heat treating. A level control means 82a' regulates the opening and closing of valve 26a'', which is situated in line 24a' and regulates the flow of liquor from contactor 36a. The overhead from contactor 36a passes via line 28a' into separator 30a', and any residual moisture contained in the overhead is therein separated and passes by line 32a' back to contactor 36a. A back pressure valve 84a controls the rate of gas discharge and regulates the pressure in line 34a' leading from separator 30a', and controls the pressure of the system, in accordance with well known principles. It will be appreciated that my process may be modified by conducting the liquid and gas as described hereinabove through additional contactors. Furthermore, the apparatus as shown in FIGURES 2 and 3 may be used in series or in parallel to advantage depending on the circumstances encountered.

A further understanding of the benefits of following the practice of my invention will be appreciated from the following examples:

Example 1.—Into contactor 12 through line 20 are introduced flue gases which are produced from the combustion of methane with 50% of excess air. These resulting flue gases are at a temperature of 400° F. Also into contactor 12 through line 10 is sprayed raw sea water at 70° F. The amount of sea water introduced is adjusted to yield in contactor 12 a concentrate 22 containing 25% by weight of solids which is at a temperature of 212° F. For each 1.4 pounds of raw sea water which have 3.50 weight percent total dissolved solids (0.126% $CaSO_4$) a yield of 1.2 pounds of fresh quench steam is obtained. In addition to this water content, however, water is produced by the combustion of the methane so that each pound of methane produces 2.2 pounds of water, stoichiometrically. Accordingly, from the burning of one pound of methane and the introduction of flue gases therefrom into contactor 12 at a temperature of 400° F. and contacting said gases directly with sea water, approximately 3.4 pounds of water are produced for every pound of methane used and every 1.4 pounds of sea water introduced. This water is in the form of steam at a temperature of the atmospheric boiling point of 212° F. This steam is directed through line 28 into separator 30 and thence into contactor 36, where it encounters additional sea water which is introduced into contactor 36 in the form of sprays 38. Approximately 28.6 pounds of raw sea water is introduced for every pound of methane burned. This raw sea water has a percent solids of 3.5% by weight, as it is introduced into the contactor. In contact with the flue gases and the steam therein contained coming in through line 34, the raw sea water is diluted to contain 3.16 weight percent solids (0.114% $CaSO_4$) which is at a temperature of 212° F. This heated diluted sea water 40 is collected in contactor 36 and may be removed therefrom through line 49 and pump 50 into further heat treating apparatus 52.

Example 2.—Methane is burned in an aircraft type jet turbine engine modified for stationary service so as to permit combustion at a pressure of 4 atmospheres. As is customary in this type of engine operation, excess air is used in the combustion chamber. In the subsequent afterburner section, additional fuel is introduced so that the excess air which results from the burner and the afterburner section is maintained at 50%. The hot flue gases are introduced into chamber 12a where they encounter sprays of an evaporator concentrate stream having 5.6 weight percent solids at 140° F. The ratio of concentrate stream to hot gas introduced is so regulated to yield a 25% by weight solids final concentrate in the bottom of contactor 12a, which concentrate is at a temperature of 291° F. This temperature corresponds to water vapor saturation temperature at the 4 atmosphere combustion pressure. Based on 1 pound mol of methane burned in the aircraft engine which is introduced through line 73 of FIGURE 3, 291 pounds of steam are produced from the quenching operation which occurs in contactor 12a. This steam actually carries the preponderance of the heat of combustion of the methane. This steam and the heat which it contains plus the heat of the flue gases are carried via line 28a into separator 30a and thence are directed via line 34a into contactor 36a where they encounter additional process streams which are introduced through lines 52, 52a' and 52a''. The resulting heated diluted process streams accumulate on the bottom of contactor 36a at 40a and are conveyed therefrom through line 24a' into subsequent heat treating apparatus.

Example 3.—From the burning of methane in a jet aircraft type engine under pressure, as is more fully described in Example 2, heat and material in the form of vapor are delivered through line 34a into contactor 36a, where they encounter in turn progressively cooler process streams which are introduced through lines 52, 52a' and 52a''. The heat and material which are introduced through line 34a are absorbed by the process streams 52, 52a' and 52a'' to be heated under pressure and simultaneously diluted to produce raw stock for further heat treatment. While I have shown in Examples 2 and 3 the operation of my invention at pressures above atmospheric pressure, it will of course be appreciated by those skilled in the art, and that this invention can be utilized to advantage in affecting the removal of heat values from streams under conditions of vacuum, the cooling stream absorbing heat and becoming diluted as it does.

It will of course be appreciated that when the combustion gases are introduced into the final contactor under pressure, such that the resulting product for subsequent heat treatment is at a temperature higher than would cause precipitation of dissolved solids whose solubility decreases at increasing temperature, that portion of such solids which is precipitated would be removed from the liquid fraction by filtration, as denoted by 101 on FIGURE 3.

Having thus disclosed my invention, I claim:

1. In a process wherein a solution containing solvent and dissolved solids whose solubility decreases at increasing temperature is subjected to heat treatment, the improvement which comprises preliminarily diluting and preheating said solution by intimately, directly contacting a portion of an unheated and undiluted stream of said solution with a heated gas to vaporize a portion of the solvent therein and concentrate the solids content thereof while depleting the heat content of the gas; removing the unvaporized, concentrated stream of solution from the process; conveying the heat-depleted gas and the solvent vapors contained therein into intimate direct contact with the remaining portion of said unheated and undiluted stream of said solution to condense into said remaining portion at least a portion of said solvent vapors, thereby preheating and diluting said remaining portion; and subsequently heat treating said preheated and diluted remaining portion.

2. In a process wherein a solution containing solvent and disolved solids whose solubility decreases at increasing temperature is subjected to heat treatment, the improvement which comprises preliminarily diluting and preheating said solution by intimately, directly contacting a first liquor containing said solvent therein with a heated gas to vaporize a portion of said solvent and concentrate said first liquor while depleting the heat content of the gas; removing the unvaporized, concentrated first liquor from the process; conveying the heat-depleted gas and the solvent vapors contained therein into intimate direct contact with an undiluted and unheated stream of said solution to condense into said undiluted and unheated stream of said solution a portion of said solvent vapors, thereby preheating and diluting said undiluted and unheated stream of said solution; venting any uncondensed gas; and subsequently heat treating said preheated and diluted stream of said solution, said solution being fed directly to said dilution step from a source external to said vaporization, dilution and subsequent heat treatment steps.

3. In a process wherein a solution containing solvent and dissolved solids whose solubility decreases at increasing temperature is subjected to heat treatment, the improvement which comprises preliminarily diluting and preheating said solution by intimately, directly contacting a first liquor containing said solvent therein wtih a heated gas at pressures in excess of atmospheric pressure, said heated gas resulting from the combustion of air and fuel in an aircraft type gas turbine jet engine wherein air is introduced at atmospheric pressure and is compressed and the fuel and air are burned at pressures in excess of atmospheric pressure to produce said gas at pressures in excess of atmospheric pressure, thereby vaporizing a portion of said solvent and concentrating said first liquor while depleting the heat content of the gas at pressures in excess of atmospheric pressure; removing the unvaporized, concentrated first liquor from the process; conveying the heat-depleted gas and solvent vapors contained therein at pressures in excess of atmospheric pressure into intimate direct contact with an undiluted and unheated stream of said solution to condense into said undiluted and unheated stream of said solution at least a portion of said solvent vapors, thereby preheating and diluting said undiluted and unheated stream of said solution at pressures in excess of atmospheric pressure and subsequently heat treating said preheated and diluted stream of said solution.

4. In a process wherein a solution containing solvent and dissolved solids whose solubility decreases at increasing temperature is subjected to heat treatment, the improvement which comprises preliminarily diluting and preheating said solution at pressures in excess of atmospheric pressure through the combustion of fuel in an aircraft type gas turbine jet engine, introducing air at atmospheric pressure, compressing said air and burning fuel at pressures in excess of atmospheric pressure, conveying combustion gas from said turbine under pressure into intimate direct contact with a portion of said unheated and undiluted solution, thereby heating said solution while concentrating the solids content thereof and vaporizing at least a portion of the solvent liquor while depleting the heat content of the gas at pressures in excess of atmospheric pressure; removing the unvaporized residue from the process; and then conveying the heat-depleted gas and the solvent vapors therein contained at pressures in excess of atmospheric pressure into intimate direct contact with the remaining portion of said unheated and undiluted solution to condense into said remaining portion at least a portion of said solvent vapors, thereby pre-heating and diluting said remaining portion of solution at pressures in excess of atmospheric pressure to temperatures in excess of atmospheric pressure to temperatures in excess of the atmospheric perssure boiling point of said solution; and subsequently heat treating said preheated and diluted solution.

5. A preliminary treatment process for liquors containing dissolved solids whose solubility decreases at incrasing temperature for separation of solvent therefrom, which comprises pretreating said liquors in preparation for subsequent volatilization of solvent and recovery thereof by diluting and heating the said liquors through first contacting a stream of liquor containing dissolved solids and said solvent in intimate direct contact with heated gas, thereby heating said liquor while concentrating the solids content thereof and vaporizing at least a portion of the solvent in said liquor while depleting the heat content of the gas; removing the unvaporized liquor from the process; conveying the heat-depleted gas and the solvent vapors therein contained into intimate direct contact with additional liquor containing said solvent and dissolved solids whose solubility decreases at increasing temperature, condensing into said additional liquor a portion at least of the vapor resulting from the prior direct contacting while venting any uncondensed gas and thereby heating and diluting said latter liquor for subsequent volatilization for recovery of solvent therefrom, said additional liquor being fed directly to said dilution step from a source external to said vaporization, dilution and subsequent volatilization steps.

6. A preliminary treatment process for liquors containing dissolved solids whose solubility decreases at increasing temperature for separation of solvent therefrom, which comprises pretreating said liquors in preparation for subsequent volatilization of solvent and recovery thereof by diluting and heating the said liquors through first contacting a first stream of liquor containing dissolved solids and said solvent in intimate direct contact with heated gas, thereby heating said liquor while concentrating the solids content thereof and vaporizing at least a portion of the solvent in said liquor while depleting the heat content of the gas; removing the unvaporized liquor from the process; and then conveying the heat depleted gas and solvent vapors therein contained into intimate direct contact with a second liquor containing dissolved solids whose solubility decreases at increasing temperature and said solvent, condensing into said second liquor a portion at least of the vapor resulting from the prior direct contacting while venting any uncondensed gas and thereby heating and diluting said latter liquor for subsequent volatilization for recovery of solvent therefrom, said second liquor being fed directly to said dilution step from a source external to said vaporization, dilution and subsequent volatilization steps.

7. The process of claim 6 wherein the first liquor and the second liquor are water liquors containing dissolved solids.

8. The process of claim 7 in which both liquors are sea water.

9. The process of claim 7 in which both liquors are brackish water.

10. The process of claim 7 in which both liquors are sewage.

11. The process of claim 7 in which both liquors are industrial waste.

12. The process of claim 6 wherein the first liquor is water containing dissolved solids and the second liquor is also water containing dissolved solids, but the first liquor and the second liquor contain different dissolved solids.

13. The process of claim 6 in which the first liquor is sewage and the second liquor is another water liquor containing dissolved solids.

14. The process of claim 6 in which the first liquor is industrial waste water and the second liquor is another water liquor containing dissolved solids.

15. The process of claim 6 in which the first liquor is sea water and the second liquor is another water liquor containing dissolved solids.

16. A process in accordance wtih claim 5 which is conducted under pressure in excess of atmospheric pressure.

17. A preliminary treatment process for liquors containing dissolved solids whose solubility decreases at increasing temperature for separation of solvent therefrom which comprises pretreating said liquors in preparation for subsequent volatilization of solvent and recovery thereof by diluting and heating the said liquors through first imparting heat at pressures in excess of atmospheric pressure to said liquors containing a solvent and dissolved solids whose solubility decreases at increasing temperature through the combustion of fuel in an aircraft type gas turbine jet engine, introducing air at atmospheric pressure, compressing said air and burning fuel at pressures in excess of atmospheric pressure, conveying combustion products from said turbine under pressure into intimate direct contact with a liquor containing a solvent and dissolved solids, thereby heating said liquor while concentrating the solids content thereof and vaporizing at least a portion of the solvent liquor while depleting the heat content of the gas at pressures in excess of atmospheric pressure; removing the unvaporized liquor from the process; and then conveying the heat-depleted gas and the solvent vapors therein contained at pressures in excess of atmospheric pressure into intimate direct contact with the liquor containing a solvent and dissolved solids whose solubility decreases at increasing temperature while condensing into said liquor at the pressure in excess of atmospheric pressure a portion at least of the vapor resulting from the prior direct contacting while venting uncondensed gases, thereby diluting and heating said latter mentioned liquor to temperatures in excess of the atmospheric pressure boiling point of such liquor for subsequent volatilization for recovery of solvent therefrom.

18. The process of claim 17 wherein the fuel introduced into the aircraft type gas turbine jet engine is introduced in two stages, the first of said stages being positioned upstream of the gas turbine and the second of such stages being positioned downstream of the gas turbine.

References Cited by the Examiner

UNITED STATES PATENTS

| | | | |
|---|---|---|---|
| 236,940 | 1/81 | Faesch. | |
| 585,365 | 6/97 | Skiffington. | |
| 2,372,846 | 4/45 | Nettel et al. | |
| 2,507,632 | 5/50 | Hickman. | |
| 2,678,199 | 5/54 | Koch | 202—22 |
| 2,880,146 | 3/59 | West. | |
| 2,905,731 | 9/59 | Seed | 202—52 X |
| 2,921,004 | 1/60 | Wood. | |

ROBERT F. BURNETT, *Primary Examiner.*

NORMAN YUDKOFF, GEORGE D. MITCHELL,
*Examiners.*

UNITED STATES PATENT OFFICE
CERTIFICATE OF CORRECTION

Patent No. 3,207,676　　　　　　　　　　　　　　September 21, 19

Edmund A. J. Mroz

It is hereby certified that error appears in the above numbered patent requiring correction and that the said Letters Patent should read as corrected below.

Column 2, line 35, for "inittal" read -- initial --; colu[mn] 3, line 58, for "solution" read -- dilution --; column 7, line 33, for "presure" read -- pressure --; column 9, line 17 for "disolved" read -- dissolved --; line 41, for "wtih" read -- with --; column 10, line 12, for "perssure" read -- pressu[re] --; lines 16 and 17, for "incrasing" read -- increasing --.

Signed and sealed this 24th day of May 1966.

(SEAL)
Attest:

ERNEST W. SWIDER
Attesting Officer

EDWARD J. BRENNER
Commissioner of Patents